US008407026B2

(12) United States Patent
Schlicht

(10) Patent No.: US 8,407,026 B2
(45) Date of Patent: Mar. 26, 2013

(54) SYSTEMS AND METHODS FOR QUANTIFYING REACTIONS TO COMMUNICATIONS

(75) Inventor: Erik J. Schlicht, Arlington, MA (US)

(73) Assignee: Aptima, Inc., Woburn, MA (US)

( * ) Notice: Subject to any disclaimer, the term of this patent is extended or adjusted under 35 U.S.C. 154(b) by 344 days.

(21) Appl. No.: 12/955,498

(22) Filed: Nov. 29, 2010

(65) Prior Publication Data

US 2011/0276310 A1 Nov. 10, 2011

Related U.S. Application Data

(60) Provisional application No. 61/331,814, filed on May 5, 2010.

(51) Int. Cl.
*G06F 17/18* (2006.01)

(52) U.S. Cl. ............ 702/181; 703/6; 705/14.39; 706/54

(58) Field of Classification Search .................... 702/85, 702/179, 181, 182, 188; 703/6; 705/14.1, 705/14.39; 706/54; 709/223

See application file for complete search history.

(56) References Cited

U.S. PATENT DOCUMENTS

| | | | | |
|---|---|---|---|---|
| 6,735,572 | B2 * | 5/2004 | Landesmann | 705/14.39 |
| 8,135,565 | B2 * | 3/2012 | Clune | 703/6 |
| 2009/0043752 | A1 | 2/2009 | Kenedy | |
| 2010/0153329 | A1 | 6/2010 | Ghosh et al. | |

OTHER PUBLICATIONS

Debruine L.M. (2002) Facial resemblance enhances trust. P Roy Soc Lond B Bio 269: 1307-1312. Published Online.

Ernst M.O., Banks M.S. (2002) Humans integrate visual and haptic information in a statistically optimal fashion. Nature 415:429-433. Published Online.

* cited by examiner

*Primary Examiner* — John H Le
(74) *Attorney, Agent, or Firm* — John J. Brooks, III

(57) ABSTRACT

Embodiments of methods and systems are described that provide methods for quantifying an entity's reaction to one or more communication signals by quantifying a probabilistic relationship between the communication signal and a known relationship of an attribute to the communication signal. With this quantification, the entity's reaction can be modeled as probability distributions that can be compared to the communication signal and known relationship. With this information, an entity's reactions can be compared to an ideal algorithm that optimally integrates the known relationships and communication signals to arrive at an optimal reaction. By making this comparison between the entity's reaction and an optimal reaction, a quantitative calibration measure can be determined. The meaning of the communication signals, or relationships to an attribute, may or may not be known and in embodiments the quantification of reactions can provide an ability to estimate an unknown attribute from the communication signals.

16 Claims, 12 Drawing Sheets

SYSTEMS AND METHODS FOR QUANTIFYING REACTIONS TO COMMUNICATIONS

CROSS-REFERENCE TO RELATED APPLICATIONS

This application claims the benefit of U.S. application Ser. No. 61/331,814, filed on May 5, 2010, entitled "SYSTEMS AND METHODS FOR DETERMINING DECISION INFLUENCES," the entire contents of which is incorporated herein by reference.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

Investigating how people form subjective estimates of unknown attributes has been explored in fields spanning economics, I/O psychology, neuroscience, and even artificial intelligence. What makes this topic challenging, is not only the complex nature of estimating subjective attributes, but also the divergent approaches/definitions used to investigate this same concept. For example, the attribute of trust in cooperative economic tasks is often defined by the monetary investment in a partner, whereas it's defined through facial properties in some social neuroscience research. Moreover, the experimental techniques used to investigate trust have ranged from subjective, naturalistic approaches, to quantitatively-based, experimental designs.

Another hurdle that must be overcome is the task of teasing-apart or quantifying the differences in the reaction of a signal receiving person to a signal resulting from that person's characteristics (e.g., risk averse/seeking, bias), from differences that are due to the true attributes of the signal making person. This capability requires quantitative measurement of both individual biases, in addition to quantifying changes in the person's reactions due to reliable attribute information from the signal maker.

BRIEF SUMMARY OF THE INVENTION

The following summary is included only to introduce some concepts discussed in the Detailed Description below. This summary is not comprehensive and is not intended to delineate the scope of protectable subject matter, which is set forth by the claims presented at the end.

Some embodiments of the methods and systems described herein provide a method for quantifying an entity's reaction to communication signals in a simulated or real interaction. This ability is provided by quantifying a probabilistic relationship between the communication signal and the known relationship of an attribute to the communication signal. With this quantification, the entity's reactions can also be modeled as probability distributions that can be compared to the communication signal and known relationship. With this information, each entity's reactions can be compared to an ideal algorithm that optimally integrates the known relationships and communication signals in the task to arrive at an optimal reaction. By making this comparison between the entity's reaction and an optimal reaction, a quantitative calibration, such as an estimate for bias, can be determined. In some embodiments, the methods can be iterated and the reactions can be dynamically updated throughout the iterations. The meaning of the communication signals, or relationships to an attribute, may or may not be known and in embodiments the quantification of reactions can provide an ability to estimate a hidden/unknown attribute from the observable communication signals. Furthermore, sensitivity measures can be achieved that determine the ability of each entity to use reliable task information, and ignore irrelevant task information, when making decisions.

It is an object of one embodiment of the invention to provide a computer based method of measuring an entity reaction comprising receiving a reaction of a second entity to a first and second communication signal, the reaction representing an estimate of an attribute of a first entity given the first and second communication signal and automatically determining an entity reaction measure from the reaction wherein the entity reaction measure is a probability of the reaction of the second entity to the first and second communication signal. In some embodiments, the entity reaction measure comprises a probability curve automatically computed as a probability distribution for the reaction as a function of the communication signal. In some embodiments, the first and second communications signals are mapped to a first and second quantitative representation of the communication signals according to a translation protocol and the quantitative representation comprises a Gaussian distribution of the probability of the first and second communication signals given the attribute. In some embodiments, the communication signal can be a visual signal, a verbal signal or a gesture signal.

It is another object of an embodiment of the invention to provide a method of measuring an entity reaction wherein the entity reaction measure is a quantitative measure comprising a Gaussian distribution of the probability of the reaction of the first entity to the first and second communication signal. In some embodiments, the quantitative measure can reflect a bias of the entity.

It is yet another object of an embodiment of the invention to provide the method of measuring an entity reaction further comprising the step of determining an optimal reaction measure reflecting a probability of an optimal reaction of the first entity to the first and second communication signal. In some embodiments, one of the first and second communication signals has a known relationship to the attribute and the optimal reaction measure is determined by a probability distribution for the known relationship to the attribute as a function of the communication signal. In some embodiments, the method further comprises comparing the optimal reaction measure to the entity reaction measure to create an entity calibration measure.

It is an object of some an embodiment of the invention to provide a computer based method of measuring an entity reaction comprising receiving a reaction of a second entity to a first and second communication signal, the first and second communication signals comprising computer generated signals, the reaction representing an estimate of an attribute of a first entity given the first and second communication signal, the first communication signal having a known relationship to the attribute and the second communication signal having an unknown relationship to the attribute, determining an entity reaction measure from the reaction wherein the entity reaction measure is a probability of the reaction of the second entity given the first and second communication signal, determining an optimal reaction measure wherein the optimal reaction measure comprises a probability of the reaction given the first communication signal and determining an entity calibration measure from the entity reaction measure and the optimal reaction measure. In some embodiments, the entity reaction measure and the optimal reaction measure are determined from a plurality of reactions to a plurality of first and second communication signals.

It is an object of an embodiment of the invention to provide a computer based system for measuring an entity reaction, said system comprising a means for receiving a reaction of a second entity to a first and second communication signal, the reaction representing an estimate of an attribute of the first entity given the first and second communication signal and a means for automatically determining an entity reaction measure from the reaction wherein the entity reaction measure is a probability of the reaction of the first entity to the first and second communication signal. In some embodiments, the computer based system further comprises a means for translating the communication signal to a quantitative representation of the communications signal comprising a Gaussian distribution of the probability of the first and second communication signals given the attribute and the means for automatically determining an entity reaction measure comprises a processor executing a computer program product capable of computing a probability distribution for the reaction as a function of the communication signal to determine the entity reaction measure.

BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

System and methods to quantify reactions to communications will now be described in detail with reference to the accompanying drawings. It will be appreciated that, while the following description focuses on an assembly that is capable of quantifying reactions of a person to communications of another person, or a simulated other person, the systems and methods disclosed herein have wide applicability. For example, the systems and methods described herein may be readily employed to determine influences of groups of persons, organizations, computer programs or other entities that select choices or make decisions. Examples of this include using the methods to determine the bias of an individual given different visual communication signals or to determine the buying preferences of a group of people given different product designs. The systems and methods may also be used to determine influences of those entities based on information sources such as, but not limited to real persons, groups of persons, newspapers, books, on-line information sources or any other type of information source. Notwithstanding the specific example embodiments set forth below, all such variations and modifications that would be envisioned by one of ordinary skill in the art are intended to fall within the scope of this disclosure.

As used throughout this description, a quantitative representation means any type of representation such as, but not limited to, numeric, vector, graphic, mathematical representation or any other representation that can be used to quantitatively compare different variables.

As used throughout this description, a communication signal means any action or inaction imparting information such as, but not limited to visual, gestures, verbal, electronic or computer generated communications or signals of information. A communication signal may be contextualized or it may not include information about the context of the communication signal.

As used throughout this description, a reaction means any type of response to some influence such as but not limited to verbal, physical, neurological, physiological, conscious or subconscious responses to a communication signal.

As used throughout these methods, a protocol is a set of rules governing the format of one type of information set to another. For example only, and not for limitation, a protocol is able to translate a communication signal to a quantitative representation of the communication signal.

Figure 1A:
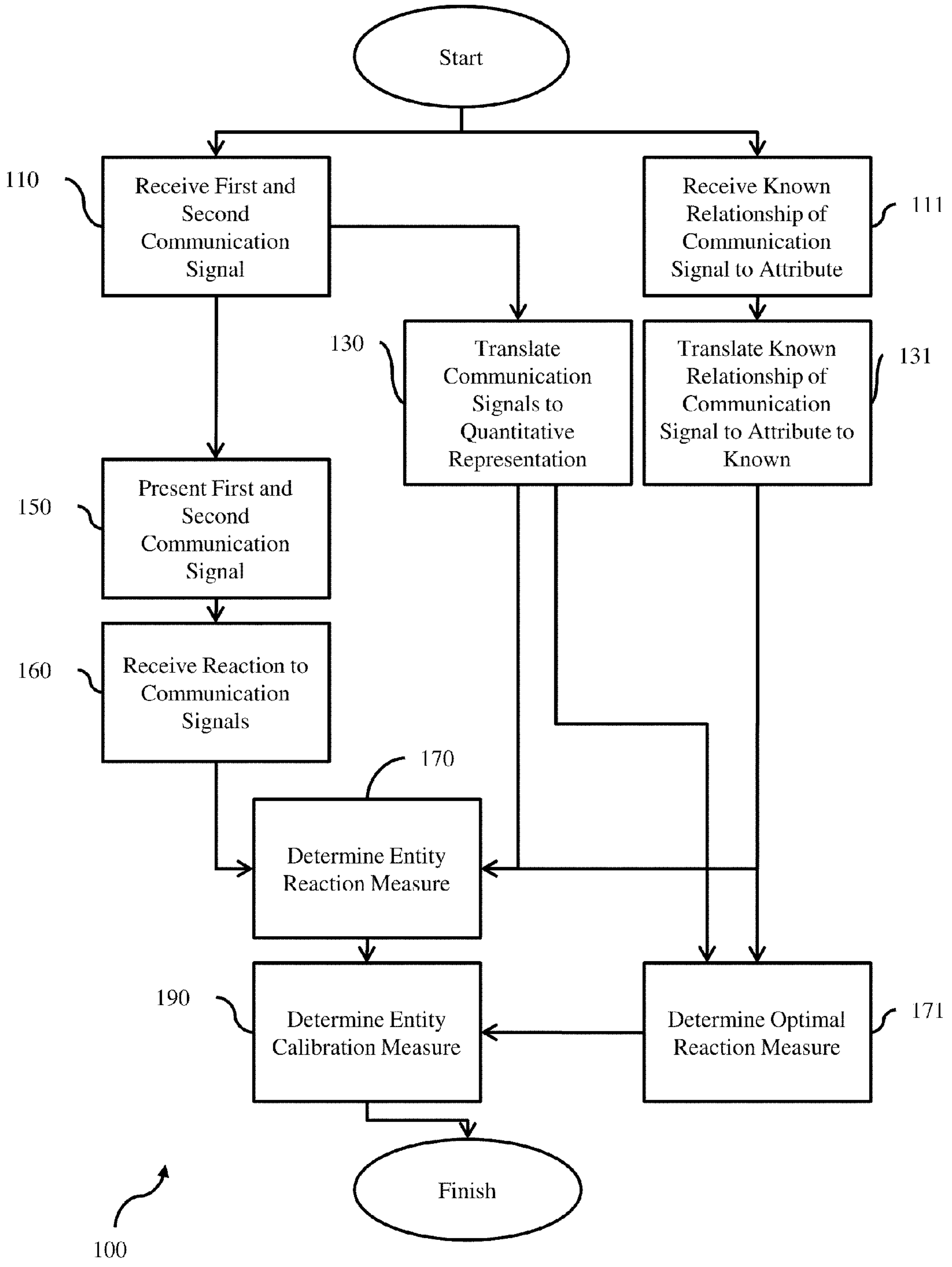
FIG. 1A illustrates a process diagram outlining an overview of one embodiment of the methods to quantify reactions to communications.

A general overview of the influence determining methods is shown in FIG. 1A. As shown, the method 100 comprises receiving a first and second communication signal at 110 and receiving a known relationship of one of the communication signals to an attribute at 111. These communication signals and known relationships are translated to quantitative representations and knowns at steps 130 and 131 respectively. Within these steps, a translation protocol maps the communication signals and knowns to quantitative representations of the communication signals and the known relationship of the communication signal to the attribute. The communication signals and known relationships come from information sources, but not always from the same information source. The information source may comprise a database of predefined mappings of communication signals and knows to quantitative representations. The communication signals are presented to an entity at 150 and the entity's reaction to the communication signal is received at 160. The reaction is combined with the known and the first and second (quantified) communication signals and a reaction measure is determined at 170. The known is also used to determine an optimal reaction at 171 with the communication signals and both the optimal reaction measure and the entity reaction measure are used to determine an entity calibration measure at 190. The result of this method is a measure of an entity's reaction to communications signals compared to an optimal reaction. In embodiments where the optimal reaction reflects reactions to knowns such as a truth, the entity calibration measure is a measure of the difference between the entities reaction, trying to estimate the truth of the communication signal, and the actual truth which may be a bias of the entity.

Figure 1B:
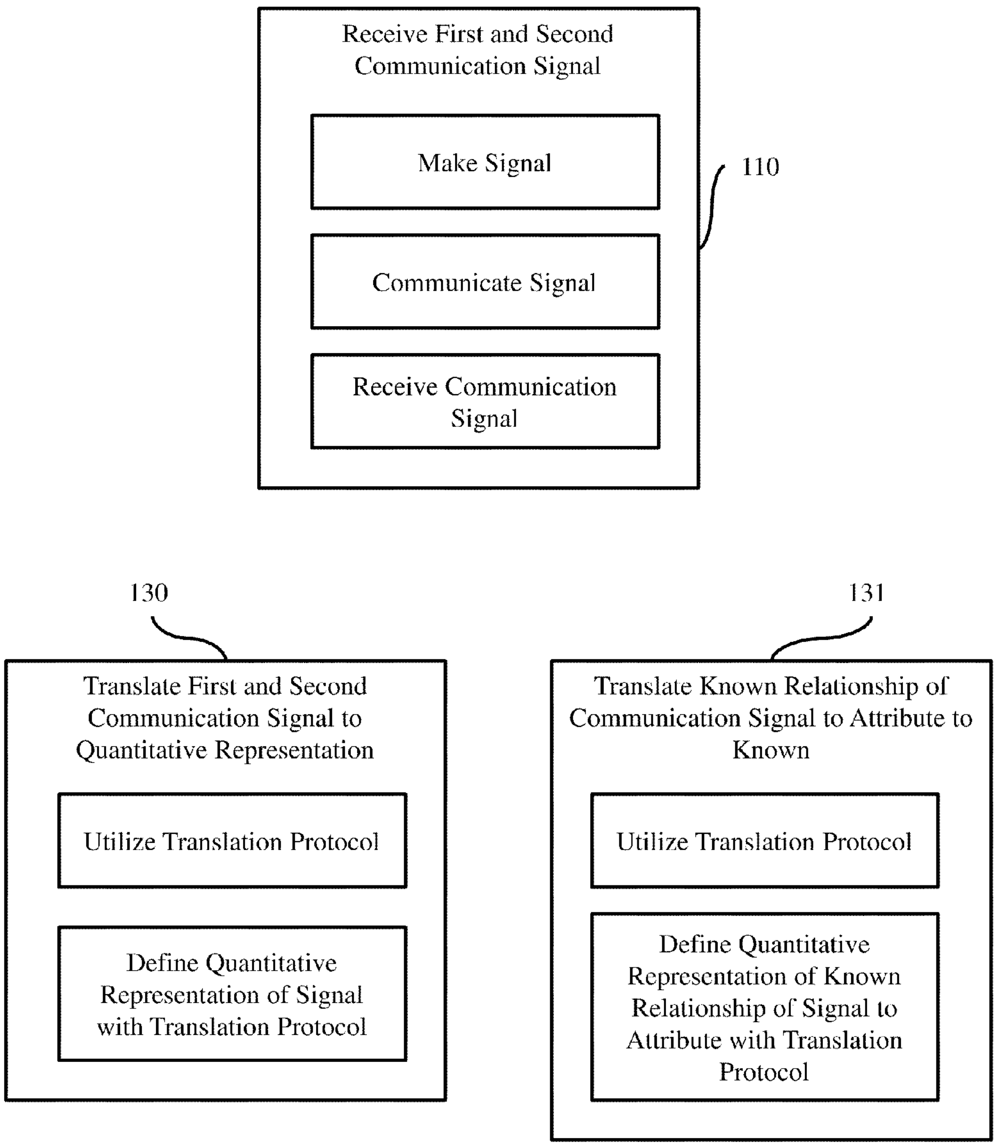
FIG. 1B illustrates more detailed process elements of the diagram shown in FIG. 1A.
Figure 1C:
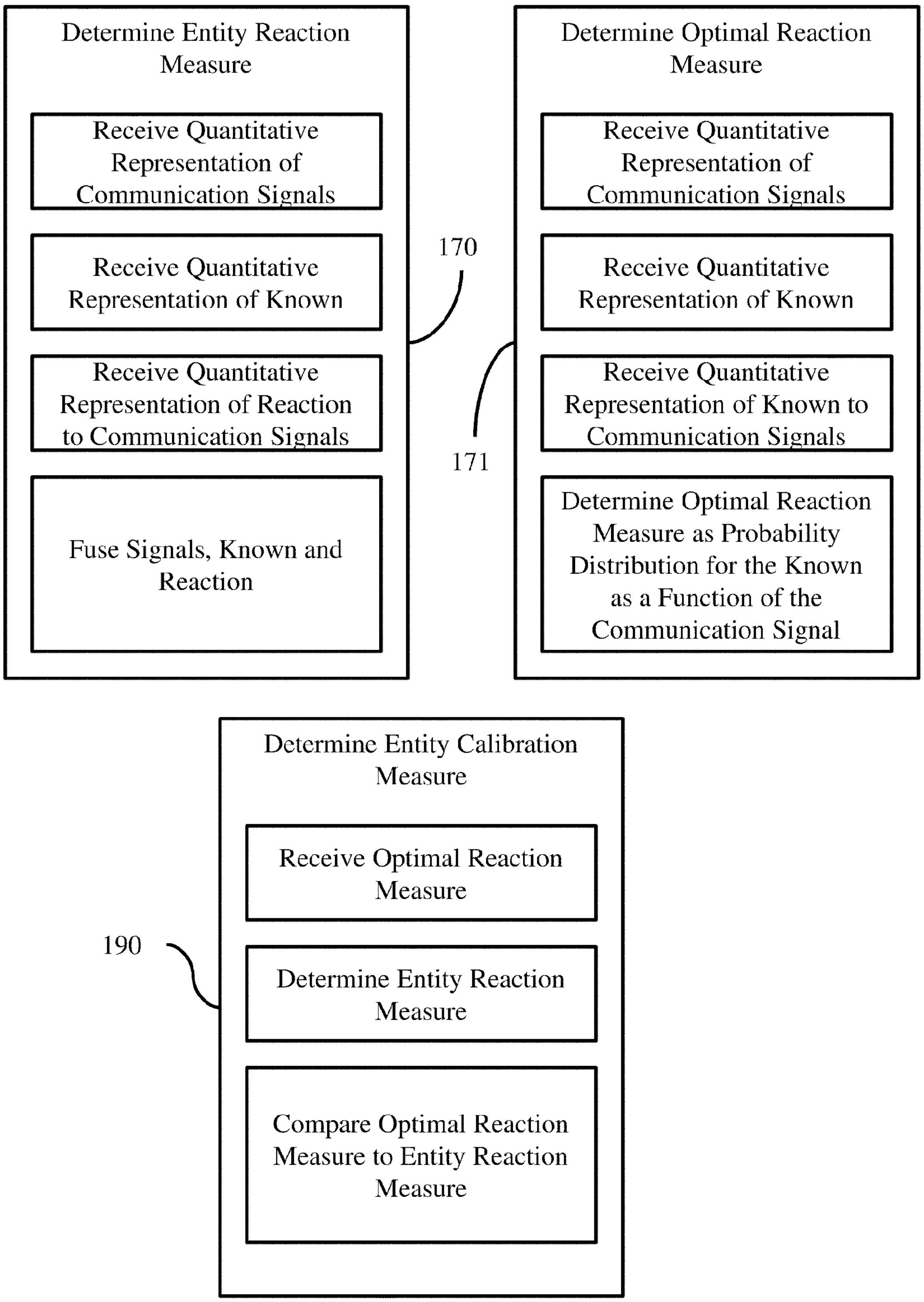
FIG. 1C illustrates more detailed process elements of the diagram shown in FIG. 1A.

Example embodiments of selected steps in FIG. 1A are detailed in FIGS. 1B and 1C. In FIG. 1B, step 110 contains the details where a communication signal is made, communicated and received through any means. Once received, at step 130, a translation protocol had been defined to categorize communication signals so that it can be mapped with the predefined protocol to a quantitative representation of that communication signal. A translation protocol is a means to map a communication signal to a quantitative representation. A communication signal is any method of communicating information and a quantitative representation of the communication signal is any representation of communication signals that can be used to compare representations. An example of a communication signal is an verbal answer to a question presented to an individual and an example of a quantitative representation is a probability curve that estimates the probability of X (attribute) given the presence of Y (communication signal). The result of this step 130 is a communication signal defined by a quantitative representation.

Step 131 shows details of translating a known relationship of the communication signal to an attribute to a "known". The translation protocol is defined to categorize the communication signal and it's relationships with attributes and allows the known to be mapped to the communication signal and a quantitative representation. An example of a known relationship is whether the answers to questions are known to be true or untrue. Again, an example of a quantitative representation can be a probability curve of X (probability of true/untrue responses) given the frequency of questions Y (communication signal/question). The result of this step 131 is a quantitative representation of the known for the related signal and or communication signal.

Referring to FIG. 1C, step 170 details an example embodiment of determining the entity reaction measure. In this step, the quantitative representation of the known and the quantitative representation of the reaction to the communication signals are received. This measure is determined by updating the probability distribution for the response, as a function of the communication signal presented. Examples of this measure include probit and logistic curves, in addition to nonparametric statistical techniques. In this example the probability of a particular response (e.g., trust decision) is updated using probit techniques. In this respect, the subject's current response is used to update the probability distribution from previous responses, which forms a new decision curve for the current time. Therefore, these entity reaction measures dynamically update across time. More specifically, each response is recorded as a point on a scatter plot, where the y-axis of the plot represents the response value (e.g., 1=trust decision; 0=no trust decision), and the x-axis is determined by a binomial learning model that perfectly estimates (p(truthful)), based on the (known) values of the hidden attribute. This allows the reaction measures to be formed for each response type, and later fused to form a combined measure, if desired. Moreover, entity measures can be developed in a similar manner to determined the sensitivity of subjects to un/reliable communication signals by exchanging the x-axis from p(truth) to p(truth|signal).

At step 171, an optimal reaction measure is determined. This measure is determined by using a technique similar to 170 where the optimal reaction measure is a probability distribution for the known as a function of the communication signal.

Referring again to FIG. 1C, step 190 details an example embodiment of determining an entity calibration measure.

Although not necessary, some embodiments of the methods have the communication signal and relationships of communication signals translated to a context. In these embodiments, this contextual signal can be analyzed using methods similar to the methods for communications signals above.

To illustrate these steps only, and not for limitation, one embodiment of systems and methods will be described below.

One Embodiment of Methods to Quantify Reactions to Communications:

To illustrate example embodiments of methods to quantify reaction to communication, and not for limitation, an embodiment of the methods used to quantify one person's (trustor's) interpretation of the attribute of truthfulness of another entity (trustee) will be used. The person whose reaction will be monitored and quantified will be termed the "trustor" and the entity that will be communicating signals will be the "trustee". In this context, it is the job of the trustor to determine if the reliability or truthfulness of the information provided by the trustee, which unfolds/updates across the interview process. Techniques in this process include the trustor asking both questions to which s/he knows the answer [known questions: a known relationship (known correct/incorrect answer) of the attribute (trust) to the communication signals (answer statement)], in addition to questions in which the answer is not known [unknown questions: an unknown relationship of the attribute to the communication signals]. The idea is that the trustee's answers to the known questions may provide insight into the reliability to the unknown information. Moreover, the trustor can use the trustee's behavioral patterns to determine when the response provided is truthful (e.g. 'tells', in poker terms).

Figure 2A:
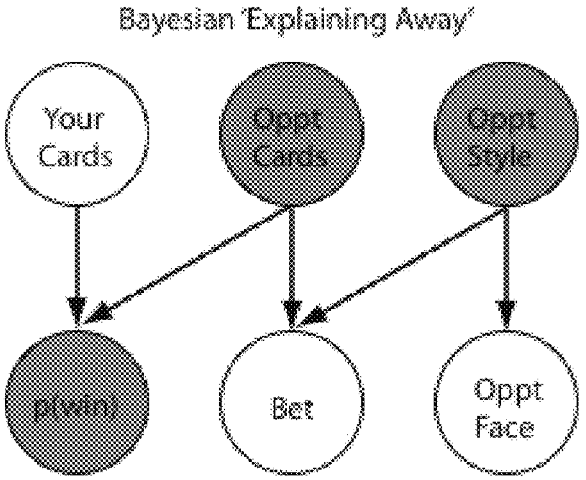
FIG. 2A illustrates a Bayesian Network for a poker experiment using embodiment of the methods disclosed.

A general challenge for using behavioral patterns is that it's often unclear when such information is indicative of truth telling, or is an uninformative 'tick'. When participating in a communications with an unfamiliar individual, rapid impressions of the opponent are formed through observable information, and depending on the situation, different attributes become important to estimate. For example, success in a poker game is limited by a player's ability to estimate their opponent's strategy. Since an opponent's strategy cannot be directly observed, it must be inferred through auxiliary information (e.g., facial properties). This inferential process is deeply related to concepts in Bayesian explaining away which provides a formal framework for how information is used to arrive at estimates of hidden variables. FIG. 2A shows a Bayesian network for the poker task mentioned above. White nodes are hidden variables, and gray nodes correspond to observable information. Arrows between nodes represent conditional relationships between the variables. In this scenario, the probability of winning the bet amount is based on the subject's starting hand (observable variable) and their opponent's hand (hidden variable). Since subjects cannot directly observe their opponent's hand, they can use the fact that the opponent bet (observable variable) to put them on a 'range' of possible hands. However, in order to do this accurately, they must have an estimate of their opponent's style of play (hidden variable). More specifically, the probability of a particular hand winning is lower against an opponent who only bets with high-value hands, compared to an opponent who frequently bluffs (i.e, bets with poor hands). Since the opponent's style is also a hidden variable, subjects can use an opponent's face information (observable variable) to estimate their style. This process is called Bayesian 'explaining away', as the opponent's face explains-away the possibility of a bluff being the cause of an opponent's bet. Aligning this Bayesian model for the interrogation task with the methods of FIG. 1A, communication signals include eye movements, hand gestures, and verbal information. The hidden attribute that the subject is trying to estimate about his/her virtual opponent is their truthfulness. The subject's trust/no-trust decisions correspond to their reaction measure, and from this information, their bias to particular 'types' of opponents can be calculated (e.g., FIG. 8C, middle).

Figure 2B:
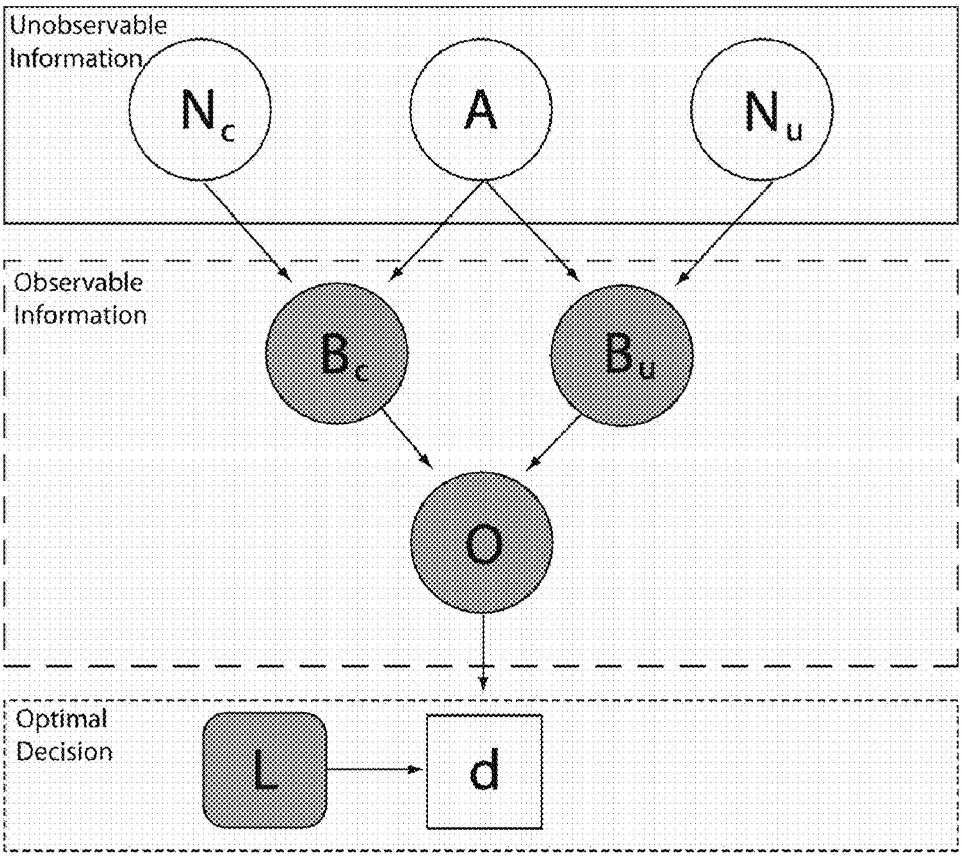
FIG. 2B illustrates a Bayesian Network demonstrating how hidden attributes (A), can be inferred via observable behaviors (B), independent of nuisance parameters (N), and how this estimate is used to make decisions (d), when integrated with a loss function (L)

FIG. 2B shows a use of the general process to be used in this example embodiment. As described above, several steps of the methods include utilization of a translation protocol to quantify elements used in the process. FIG. 2B takes the general process of FIG. 2A and applies it to quantifying reactions to communications signal. These methods reflect a Bayesian Model for Fusing Controlled and Uncontrolled Behavioral Information discussed in detail below. Referring back to FIG. 2B, when estimating an attribute of interest about another (A), it is often the case that the attribute is not directly observable (unknown), and therefore must be inferred through the observable information/communication signals (e.g., known behaviors—B). Complicating matters is the fact that behaviors are often not uniquely produced by the attribute of interest, but can also be the result of other parameters, not being estimated (i.e., nuisance variables—N). Moreover, arriving at a combined estimate of another's attribute of interest requires fusing information from disparate modalities to arrive at a combined estimate (O) to use for making decisions (d). This entire process has many technical challenges to overcome, and this Bayesian Model is a unique way to solve these challenges. This Bayesian Network for a model that has the ability to fuse controlled (Bc) and uncontrolled (Bu) behavioral information, to make a decision (d) about another's attribute of interest (A).

In order to estimate an attribute (A) of another entity, it requires that the attribute be estimated through observable information/communication signals (B). One method of quantifying the attribute (A) is to utilize Bayes' rule:

$$p(A \mid O) = \frac{\int\int p(O \mid A, N_u, N_c) p(A) dN_u dN_c}{p(O)} \tag{1}$$

Where p(A|O) is the (posterior) probability of attribute (A), given the fused behavioral observations (O) about the other. Notice that nuisance variables (Nc, Nu) were integrated-out, allowing us to focus on the attribute of interest.

Using this Bayes' rule, the method is able to accommodate many attributes of interest about another (e.g., trustworthiness, strategy, competence, etc.). Moreover, it is robust enough to fuse information from many different sources. For example, when estimating another's trustworthiness, you have two very different sources of information available: 1) information they offer you (i.e., Controlled behavioral information—Bc); and 2) behavioral 'tells' that are not being consciously offered by the other person (i.e., Uncontrolled Behavioral Information—Bu). Examples of controlled behavioral information may include verbal information, monetary returns/outcomes (e.g., in poker or negotiation), and clothing/appearance, while uncontrolled behavioral information includes face information (e.g., gaze, sweating, pupil dilation, etc.), posture, and nervous tics.

The challenge of fusing the information requires the various observable variables to be transformed to a quantitative representation. For example, if we assume that there are four sources of information about another's trustworthiness (clothing—c, verbal—v, gaze—g, and posture—p), which can be quantitatively represented as Gaussian, then the optimal combined estimate ($N(\mu_c\sigma_c)$) is provided by:

$$\mu_c=\omega_c\mu_c+\omega_v\mu_v+\omega_g\mu_g+\omega_p\mu_p, \tag{2}$$

$$\text{where } \omega_i = \frac{\frac{1}{\sigma_i^1}}{\frac{\overset{1}{\Sigma}}{\sigma_i^2}}, \text{ and}$$

$$\sigma_c = \sqrt{\frac{\sigma_3^2\sigma_p^2}{\sigma_3^2+\sigma_p^2}} \tag{3}$$

where $$\sigma_3 = \sqrt{\frac{\sigma_C^2\sigma_v^2\sigma_g^2}{\sigma_C^2*\sigma_v^2+\sigma_g^2*\sigma_v^2+\sigma_C^2*\sigma_g^2}} \tag{4}$$

Note that the representation need not be Gaussian, rather the distributions just need to be conjugates. The optimal fused estimates will take-on different forms according to the parameterization.

Once an estimate has been fused, then we're able to use that information to make a decision. In the Bayesian decision-theoretic sense, an optimal decision is one that maximizes the expected gain, or minimizes the expected risk associated with the decision:

$$R(A,d)^*=\arg\min_d p(A|O)L(A,d) \tag{5}$$

The loss function (L(A,d)) allows for the cost of making an error to impact the decision. In the context of economic decision making, it would include the monetary consequences corresponding with each possible decision, whereas in the context of judging another's trustworthiness, it would involve the cost of incorrectly deciding if the person was trustworthy or untrustworthy. Defining optimal behavior allows the model to be compared to human performance to assess if they are acting optimally. This could be used for training or more basic research purposes.

Figure 3:
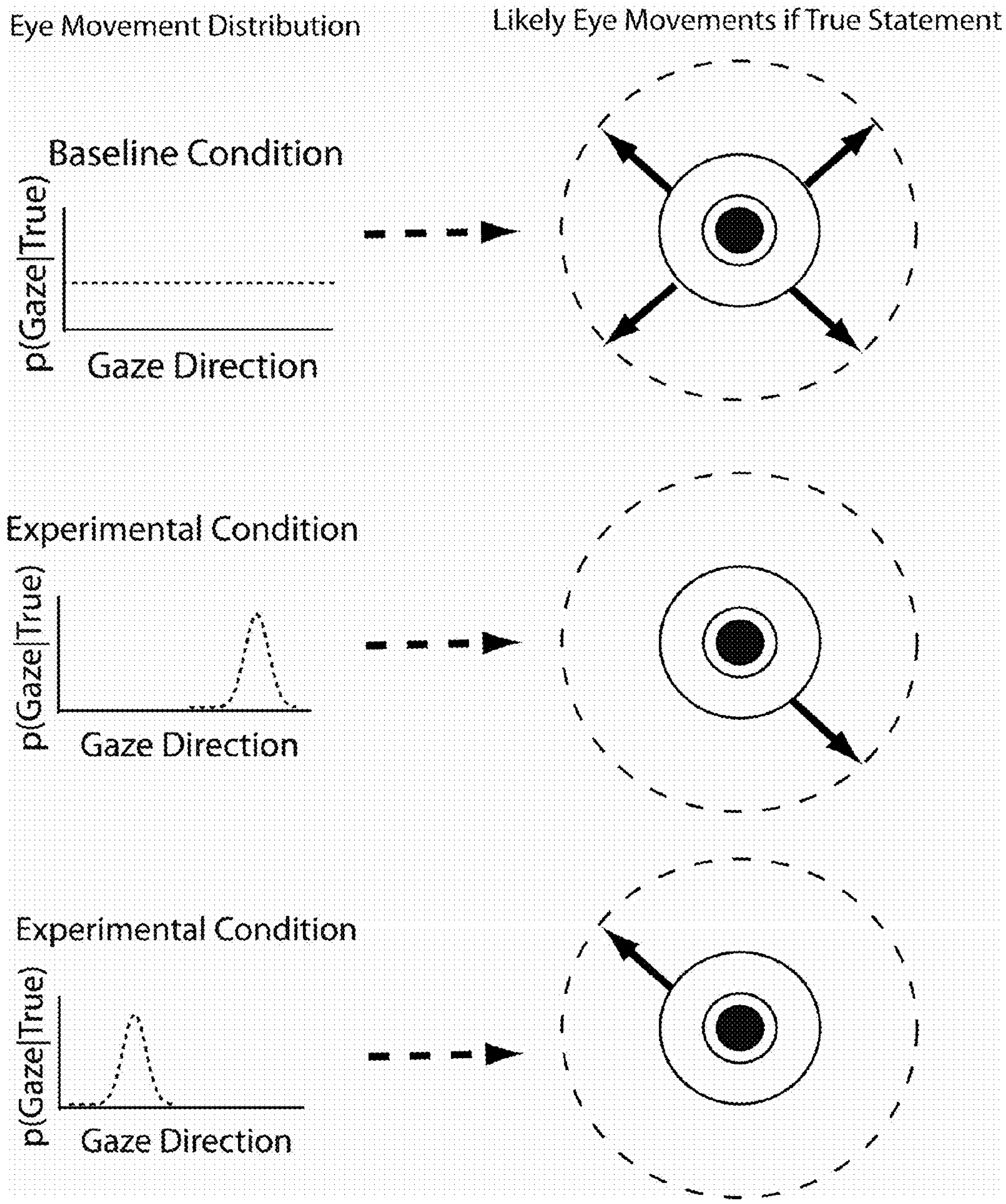
FIG. 3 illustrates an example embodiment of the translation protocol showing how communication signals are translated to a quantitative representation.

FIG. 3 illustrates a high level example of using the translation protocol to map a communication signal to a quantitative representation. With this translation protocol, communication signals are probabilistically mapped to the hidden attribute through different underlying distributions. For example, if we are interested in people's biases independent of their ability to detect reliable signals, we will want to make communication signals uninformative (i.e., uncorrelated) with the hidden attribute. This can be accomplished by sampling communication signals (e.g., eye movements) from a uniform distribution whenever a hidden attribute is present (e.g., truth). This results in all eye-movements (e.g., directions) being equally likely when the simulated other expresses the hidden attribute. However, if we are interested in people's ability to use reliable communication signals to infer the hidden attribute, then communication signals can be sampled from a distribution (e.g., Gaussian) centered around a particular communication signal value (e.g., eyes looking up, and left) whenever the hidden attribute is present. Note that this communication signal can be arbitrarily mapped to a communication signal value (e.g., eyes looking down, and right), and this mapping is not dependent on a particular type of communication signal distribution (e.g., Gaussian, etc.).

The result of defining this translation protocol is a way to create a database or table that includes a list of candidate communication signals and potential mappings to different probability distributions. This database or table can be predefined or they can be refined and created as part of an iterative process to feed and update the database or table.

Using this translation protocol, it is possible to quantify elements of the process such as communication signals and knowns. The result is a mapping that has the following desirable characteristics in a trustee/trustor embodiment: 1) Probabilistically defining trust information allows for different concepts/definitions of trust to be mapped into the same experimental/quantitative framework; 2) Trust can be measured and updated dynamically across an 'interview/interrogation'; 3) Ability to elicit implicit/explicit biases through a rigorous baseline procedure, allowing for individual factors to be distinguished from reliable trust communication signals; 4) Quantitatively determines individual sensitivities to reliable trust information; 5) Ability to systematically manipulate information in a complex/realistic simulation to allow for the clean interpretation of data, in addition to maximizing the generalization of the results; and 6) Ability to distinguish if reliable neural/physiological communication signals are being factored into trust decisions. This is useful for signal amplification and signal correlating/substituting, which could play an important role in 'detaching' the trustor from the equipment, in other embodiments.

Referring back to FIG. 1A, a specific example of one embodiment of the methods will illustrate the methods with the protocol described above. This example will use an embodiment of a computer based training system having an avatar that represents attributes and communication signals of another person, a trustee. Another person, the trustor, will interface with the computer system and that interfacing will include viewing communication signals from the trustee and will include allowing the trustor to react to those communication signals and provide input to the computer system reflecting those reactions.

In this embodiment, it is the job of the trustor to determine if the reliability of the information provided by the trustee, which unfolds/updates across the interview process. Techniques in this embodiment include the trustor asking both questions to which s/he knows the answer ('known questions'), in addition to questions in which the answer is not known ('unknown questions'). The idea is that the trustee's answers to the known questions may provide insight into the reliability to the unknown information. Moreover, the trustor can use the trustee's behavioral patterns to determine when the response provided is truthful (i.e., 'tells', in poker terms). A challenge for using behavioral patterns is that it's often unclear when such information is indicative of truth telling, or is an uninformative 'tick'. One property of these systems and methods is that they allow for the reliability of communication signals, such as behavioral cues, to be experimentally controlled, providing insight into how well trustors are using reliable behavioral patterns, in addition to their ability to ignore uninformative behavioral information.

Figure 4A:
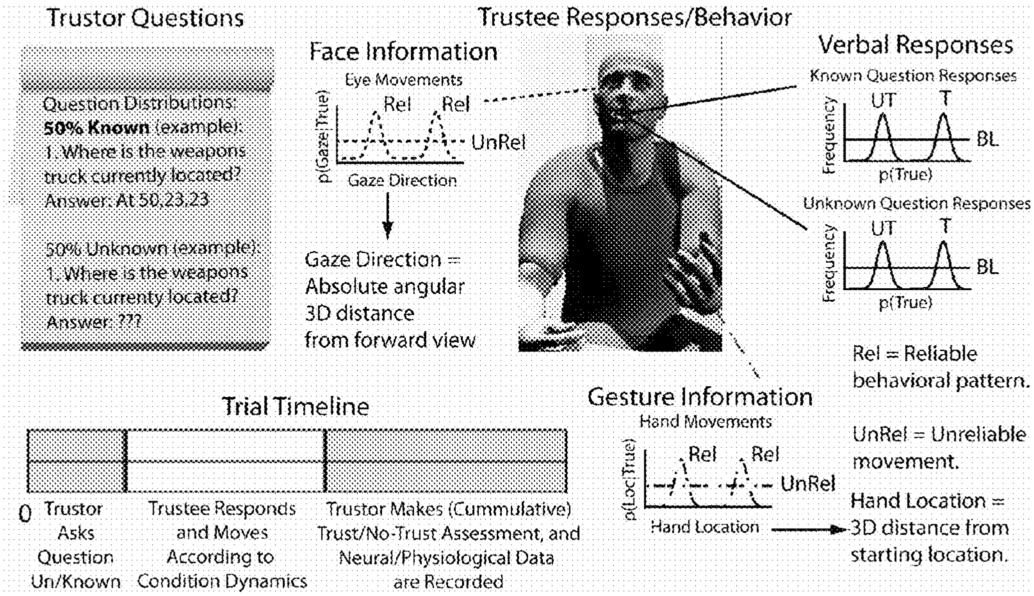
FIG. 4A illustrates an overview of method elements used in one embodiment of the methods to quantify reactions to communications.

FIG. 4A illustrates an overview of various communication signals, and potential translational protocols for each communication signal in this embodiment of the methods. In this embodiment, trustors are seated in front of a high-fidelity computer looking at a simulated/virtual trustee. Subjects are hooked-up to physiological/neural recording devices throughout the procedure. These recording devices are one means to receive the trustor's reaction to the communication signals of the trustee. Trustors are told that their task is to determine the attribute of trustworthiness of the simulated person by asking them known and unknown questions during an interview process. As shown under the Trustor Questions, Trustors will be randomly presented with either known or unknown questions. Unknown to subjects, there can be equal numbers of each 'type' of question, to allow for entity response measures to be derived for each of the verbal information 'types' (or a combination of each). As shown under the Trustee Responses/Behavior, unknown to the trustor, the communication signals (simulated responses and behaviors) of the trustee are controlled as a function of the experimental condition. If trustees are untrustworthy (UT), translation protocol will be a distribution on the lower end of the verbal truthfulness range (on the p(True) vs Frequency distribution). Whereas, if trustees tend to be truthful, translation protocol will map to a different distribution (T). Moreover, the trustee's communication signals (e.g., gaze direction and hand position) can also be differently correlated with the truthfulness of the trustee's response (e.g., p(HandLoc|True)). If the correlation between the truthfulness of the response and a particular behavioral pattern is high, then this is a reliable cue that can be used to determine the trustee's truthfulness during 'unknown' questions. Therefore, these methods allow us to distinguish reliable communication signals from unreliable communication signals, while in the context of a natural (and rich) environment. After each trial, the subjects will respond their cumulative/overall impression of the trustee's trustworthiness (1=trust; 0=do not trust). This will enable the determination of both the entity response and calibration measures by updating these response distributions.

Moreover, since we are using an approach that maps communication signals to hidden attributes, we can determine an optimal reaction measure. Having this optimal measure allows us to compare it to the trustor's reaction measure and determine the trustor's calibration measure which includes insight into each trustor's sensitivity to true information (i.e., slope parameter) as well as to their bias in responding to information (i.e., offset parameter). Moreover, physiological reactions during trust decisions can be measured and summarize by a (robust) sufficient statistic (e.g., maximum activation, average response, etc.) to use for entity reaction measures, as a means to determining entity calibration measures.

An obstacle to discovering reliable trust communication signals is that individual differences in behavioral, neural and physiological responses must be measured and factored into the analysis. The disclosed methods of this embodiment accomplish this by running each subject in an entity reaction measure, with a translational protocol where all of the relevant information regarding the trustworthiness in the 'trustee' is kept constant (i.e., sampled from a uniform distribution). Mapping this technique into a realistic scenario has very robust and has profound implications: 1) It allows for each individual's implicit/explicit biases to be quantitatively measured; 2) Important factors from the literature such as race [13], risk seeking/aversion [14], and competence [15] can be measured and/or manipulated to quantify their influence on trust estimation, and later factored-out as nuisance variables, if desired; 3) Optimal aggregate estimates (across trustors) can be accomplished via optimal data fusion techniques [16] that give more 'weight' to trustors who are more sensitive to trust information. Moreover, each person's bias can be removed during the aggregation process.

Figure 4B:
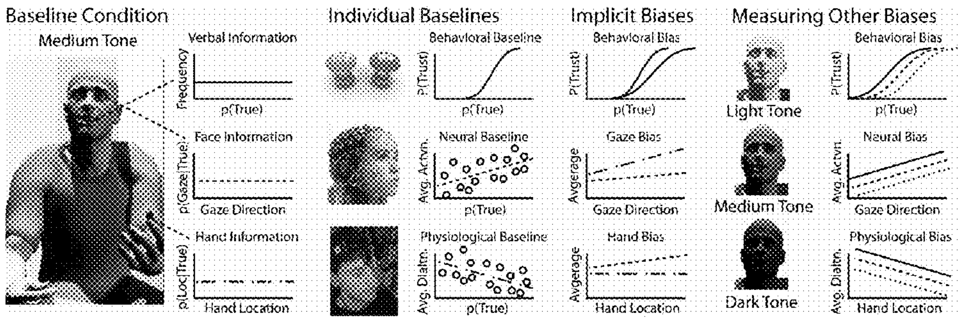
FIG. 4B illustrates an overview of baseline conditions used in one embodiment of the invention.

FIG. 4B illustrates an overview of the one translational protocol, where communication signals are uncorrelated with hidden attributes, used in this embodiment of the methods. As shown under Baseline Condition, all the communication signals in the task are being sampled from a uniform distribution. As shown under Individual Baselines, each trustor's responses to the 'known' verbal information will produce an entity response measure that provides their sensitivity or ability to incorporate (neutral) communication signals to form trust estimates dynamically across time. This allows us to determine each individual's entity calibration measures, during this 'signal-neutral' translational protocol. As shown under Implicit Biases, these methods have the ability to distinguish how the trustor's trust estimates change across known (first black curve) and unknown (second black curve) verbal signals, in addition to how neural (dashed lines) and physiological responses (dash-dotted lines) change as a function of (uninformative, in this condition) biological signals (e.g., Gaze Direction (middle) or Hand Location (lower)). As shown under Measuring Other Biases, these methods have the ability to assess how people's trust decisions changes as a function of other relevant signals, such as face information (e.g., race).

These methods are also able to accomplish discovering reliable signals in the trustor that reflect beliefs about the trustee. In order to realize this goal, entity calibration measures are computed across responses, to determine if responses are sensitive to reliable changes in communication signals. This is afforded by the baseline task where reactions, such as continuous neural data are turned into a binary response to allow for entity calibration measures to be calculated. More specifically, neural and physiological summary statistics are categorized as either above baseline (1) or below baseline (0). Moreover, since these methods systematically control the behavioral patterns that reliably predict the trustworthiness of the trustee, it allows us to determine how sensitive each trustor is to reliable changes in trust information.

These methods have several desirable characteristics: 1) Allows for reliable behavioral patterns to be teased-apart from uninformative movements to assess if trustors are using un/informative communication signals to make their decisions; 2) Since experimental measures are interpreted with respect to each person's baseline, it is only sensitive to changes in behavioral/neural/physiological responses due to the trustworthiness of the trustee; 3) Can discover reliable neural/physiological responses that are not being used to make trust decisions. This is a potential candidate for communication signal amplification/bio-feedback; 4) Ability to assess the correlation between 'high-level' neural/physiological measures (e.g., EEG), and 'low-level' measures (e.g., GSR, HR, etc.). If reliable neural/physiological responses are correlated across levels, it allows the trustor to be 'unhooked' from the expensive/bulky machines, for easier transition into field applications.

Figure 4C:
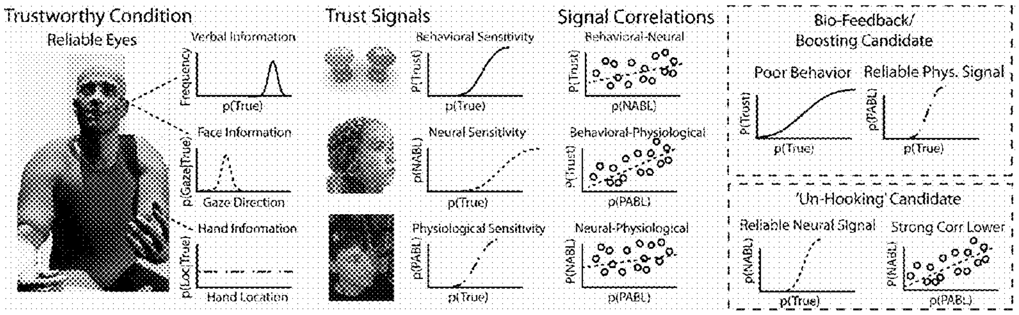
FIG. 4C illustrates an overview of how observable information can be manipulated to quantify how this changes and individual's decisions, relative to their own baseline bias.

FIG. 4C illustrates a diagram outlining one type of translation protocol that can be used in these methods. In the example embodiment above, the verbal responses of the trustee are sampled from a 'truthfulness' distribution that is, on average, true. Moreover, the gaze direction (rotational distance away from forward) is correlated with the truthfulness of the answer: if the answer is correct, the trustee is more likely to make a particular eye movement (See FIG. 3 for example). However, hand movements are uncorrelated with response truthfulness, thereby allowing us to determine if the trustor is sensitive to reliable (eye movement) communication signals, or unreliable (hand movement) communication signals. Entity calibration measures for behavioral (p(Trust)), neural (p(NABL)=probability neural is above baseline) and physiological (p(PABL)=probability physiological is above baseline) are computed. Since these functions are all probabilities, and computed over the same dimension (p(True)), we can correlate each of these to determine: 1. Does the trustor's (implicit) neural response reflect their (conscious) trust beliefs? 2. Does the trustor's (implicit) physiological response reflect their (conscious) trust beliefs? 3. Are the implicit neural (EEG) and physiological (pupil dilation) responses correlated? 4. Are implicit responses (EEG, dilation) correlated with observable physiological responses (HR, Respiration)? A feature of these methods is that they have the capability to potentially 'un-hook' the trustor from equipment that may not be available in the field. This would be feasible if it was discovered that reliable (implicit) neural responses were predicted by a combination of (observable) physiological responses, as the trustor could be trained to self-monitor. Moreover, these methods have the capacity to discover reliable neural/physiological responses that are not correlated with behavioral trust beliefs. This could potentially be useful for biofeedback or responses boosting: essentially, making the trustor more aware of the reliable responses to use in trust responses.

Again, using the process diagram of FIG. 1A, the example embodiment shown above can be mapped to the steps of the methods.

At step 110 of FIG. 1A, a first and second communication signal are received. Typically, but not always, these communication signals are retrieved from a database of communication signals. For illustration purposes only, these communication signals represent a first communication signal such as a verbal response to a question and a second communication signal such as a gesture. In this example, a large database of communication signals may be present and this step is the selecting of the communication signals to be analyzed. In the example of FIGS. 4A-4C the communication signals selected are those of verbal responses, face information, and hand gestures.

With step 111, a known relationship of the received communication signal to the attribute is also received. This known relationship may be for one or more of the communication signals. A known relationship does not need to be received for all communication signals. In this example, the known relationship is the truth of the communication signal and is stored in the communication signal database with the communication signal.

At step 130, the communication signals are translated into a quantitative representation according to the translation protocol. Examples of this quantitative representation include sampling communication signals from a uniform distribution in the baseline condition and from a Gaussian distribution in the experimental conditions.

At step 131, the known relationship of the communication signal to the attribute is translated to a known. This relationship between the communication signal and hidden attribute is represented by a conditional distribution p(s|a) that maps the probability of a communication signal (s) being present, to the presence of the hidden attribute (a). For example, the mean of a Gaussian distribution would reflect the strength of this relationship, and the variance would reflect the consistency of the relationship. In this example there is no reliable relationship between communication signals and attributes in the control condition (FIG. 4B), but in the experimental condition (FIG. 4C), eye movements (signal 1) reliably predict trustworthiness (hidden attribute), but hand movements (signal 2) do not reliably predict the hidden attribute.

At step 150, the communication signals are presented to the subject. Examples of this presentation include an avatar whose communication signals are controlled by the conditional distributions described in 131. In this example the avatar's hand, eye, and verbal communication signals are controlled by the probability of truth.

At step 160, the reaction to communication signal is received. Examples of a reaction include a behavioral, neural, or physiological response. Examples of receiving the reaction include recording the response to a data-file for analysis. In this example, decisions about the trustworthiness of the avatar were recorded, in addition to both neural and physiological communication signals.

At step 170, an entity reaction measure is determined. This measure is determined by updating the probability distribution for the reaction, as a function of the communication signal presented. Examples of this measure include probit and logistic curves, in addition to non-parametric statistical techniques. In this example the probability of a particular response (e.g., trust decision) is updated using probit techniques. In this respect, the subject's current response is used to update the probability distribution from previous responses, which forms a new decision curve for the current time. Therefore, these entity reaction measures dynamically update across time. More specifically, each response is recorded as a point on a scatter plot, where the y-axis of the plot represents the response value (e.g., 1=trust decision; 0=no trust decision), and the x-axis is determined by a binomial learning model that perfectly estimates (p(truthful)), based on the (known) values of the hidden attribute. This allows the reaction measures to be formed for each response type, and later fused to form a combined measure, if desired. Moreover, entity measures can be developed in a similar manner to determined the sensitivity of subjects to un/reliable communication signals by exchanging the x-axis from p(truth) to p(truth|signal).

At step 171, an optimal reaction measure is determined. This measure is determined by using a technique similar to 170, only the y-axis (actual responses), are selected according to an optimal decision rule that takes into account both the probability of the attribute, and the loss function (See FIG. 2B). Examples of this optimal decision rule include techniques that minimize the expected risk, or maximize the expected gain (e.g. Bayesian decision theory). In this example it was assumed that each type of decision mistake had equal cost, so optimal reaction measures were selected that maximized the probability of the attribute.

At step 190, an entity calibration measure is created by comparing the optimal reaction measures to the entity reaction measures. Examples of this calibration measure include, but are not limited to the comparison of the probit parameters that resulted in the entity measure to those achieved by the optimal reaction measure. In this example any differences in the slope term would suggest that the entity measure is less sensitive than optimal, whereas differences in the offset term would suggest that the entity measures are biased.

The result of this example is a quantitative bias and sensitivity measure for how the responses of a trustor correspond to a hidden attribute of a trustee, based on the available communication signals.

Figure 5:
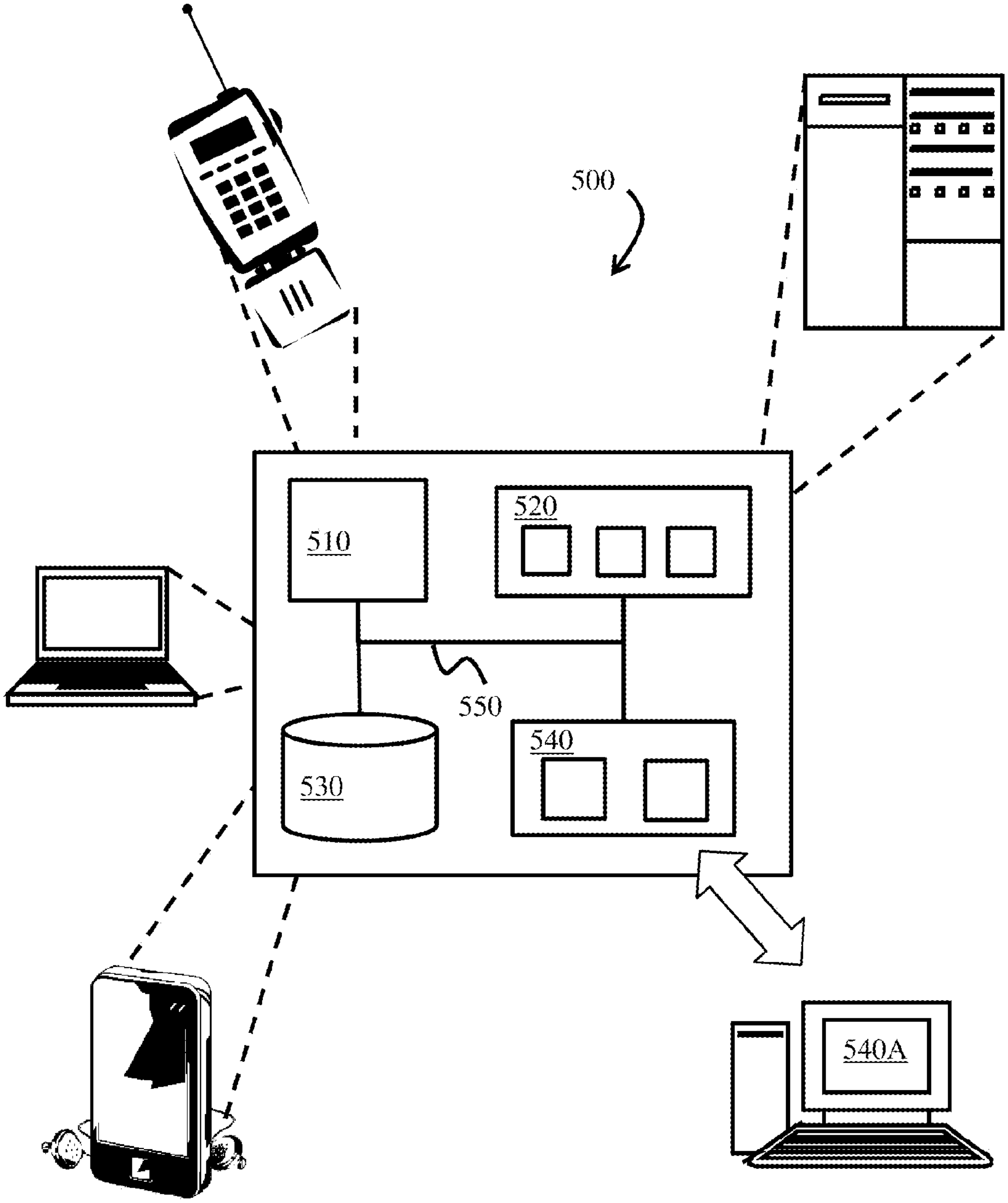
FIG. 5 illustrates one embodiment of a computer system as may be used with one embodiment of the invention.

One Embodiment of Systems for Quantifying Reactions to Communications:

The various method embodiments of the invention will be generally implemented by a computer executing a sequence of program instructions for carrying out the steps of the methods, assuming all required data for processing is accessible to the computer, which sequence of program instructions may be embodied in a computer program product comprising media storing the program instructions. One example of a computer-based system for quantifying reactions to communications is depicted in FIG. 5. The system includes a processing unit, which houses a processor, memory and other systems components that implement a general purpose processing system or computer that may execute a computer program product comprising media, for example a compact storage medium such as a compact disc, which may be read by processing unit through disc drive, or any means known to the skilled artisan for providing the computer program product to the general purpose processing system for execution thereby.

The program product may also be stored on hard disk drives within processing unit or may be located on a remote system such as a server, coupled to processing unit, via a network interface, such as an Ethernet interface. The monitor, mouse and keyboard can be coupled to processing unit through an input receiver or an output transmitter, to provide user interaction. The scanner and printer can be provided for document input and output. The printer can be coupled to processing unit via a network connection and may be coupled directly to the processing unit. The scanner can be coupled to processing unit directly but it should be understood that peripherals may be network coupled or direct coupled without affecting the ability of workstation computer to perform the method of the invention.

As will be readily apparent to those skilled in the art, the present invention can be realized in hardware, software, or a combination of hardware and software. Any kind of computer/server system(s), or other apparatus adapted for carrying out the methods described herein, is suited. A typical combination of hardware and software could be a general-purpose computer system with a computer program that, when loaded and executed, carries out the respective methods described herein. Alternatively, a specific use computer, containing specialized hardware or software for carrying out one or more of the functional tasks of the invention, could be utilized.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or reproduction in a different material form.

FIG. 5 is a schematic diagram of one embodiment of a computer system 500. The system 500 can be used for the operations described in association with any of the computer-implemented methods described herein. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display information for a user interface on the input/output device 540.

The memory 520 stores information within the system 500. In some implementations, the memory 520 is a computer-readable storage medium. In one implementation, the memory 520 is a volatile memory unit. In another implementation, the memory 520 is a non-volatile memory unit.

The storage device 530 is capable of providing mass storage for the system 500. In some implementation, the storage device 530 is a computer-readable storage medium. In various different implementations, the storage device 530 may be a floppy disk device, a hard disk device, an optical disk device, or a tape device. Computer readable medium includes both transitory propagating signals and non-transitory tangible media.

The input/output device 540 provides input/output operations for the system 500 and may be in communication with a user interface 540A as shown. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them such as but not limited to digital phone, cellular phones, laptop computers, desktop computers, digital assistants, servers or server/client systems. An apparatus can be implemented in a computer program product tangibly embodied in a machine-readable storage device, for execution by a programmable processor; and method steps can be performed by a programmable processor executing a program of instructions to perform functions of the described implementations by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and a sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display) or Plasma monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Figure 6:
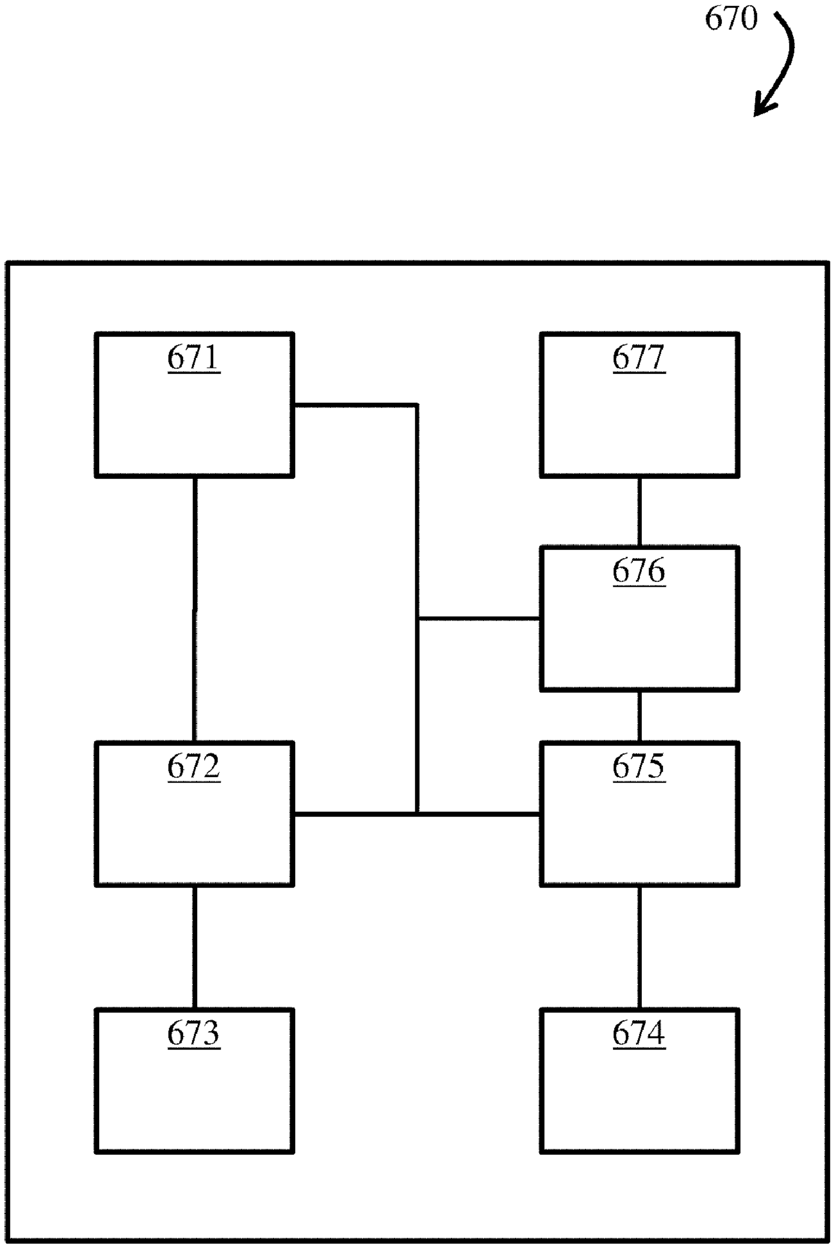
FIG. 6 illustrates a software functional diagram of one embodiment of the computer program product as may be used with embodiments of the invention.

One embodiment of the computer program product capable of executing the described methods is shown in the functional diagram in FIG. 6. As shown, the computer program product 670 comprises the following modules.

A means to receive the communication signal and the known is provided by a receiving module 671. This module receives the communication signal and the known relationships from memory or from the input/output device.

The translation protocol module 672 receives a representation of the communication signal and utilizes the defined mapping of communications signals to identify the quantitative representations. The translation protocol also receives the known and translates that into a quantitative representation. These quantitative representations are then made available for the entity reaction measure module 675 and the optimal reaction measure module 676.

The presentation module 673 provides the means to present the communication signal to an entity.

The receive reaction module 674 provide the means to receive the entities reaction to the communication signal. The module makes the reaction, or a representation of the reaction to the entity reaction measure module.

The entity reaction measure 675 module provides the means to calculate the entity reaction measure. This measure is created with information from the translation protocol module 672 and the receive reaction module 674.

The optimal reaction measure module 676 provides the means to determining the optimal reaction measure. This measure is determined primarily with input from the translation protocol module 672.

The entity calibration measure module 677 provides the means to compare the entity reaction measure and the optimal reaction measure.

The combination of these modules determines the entity reaction measure and the entity calibration measure. These measures can be communicated to other system element such as the input/output devices like a computer monitor or another computer system.

Test Results of One Embodiment of Methods for Qualifying Reactions to Communications—The Poker Test:

Once rapid impressions have been formed, beliefs can later be updated by direct experience with the individual, to develop a new estimate that will be used going forward. Within the poker scenario provided above, experience could include return on investment percentages achieved against a particular opponent. In fact, research in strategic games has explored how wagering decisions are modified through experience with a partner. In repeated trust games, people's willingness to share money with a partner is strongly influenced by both previous return rates and the probability of wagering with the same partner in future negations. It is also known that areas of the brain responsible for people's experienced-based impressions of a partner are the same areas that are known to be involved in predicting future reward, and that these regions activate differently in autistic adults.

In all of these studies, subjective estimates of a partner are used to modify wagering decisions in an economic situation that is mutually beneficial to both parties. However, little is known about how rapid impressions of an opponent, based on face information, operate and influence behavior in competitive (i.e., zero-sum) games, where one person's gain is another person's loss. In fact, research and theory in competitive games has focused on how opponent models are developed through previous outcomes (i.e., the likelihood), and how peoples' decisions relate to normative predictions. This test explored if rapid estimates of opponents are used in competitive games with hidden information, even when no feedback about outcomes is provided.

Figure 7:
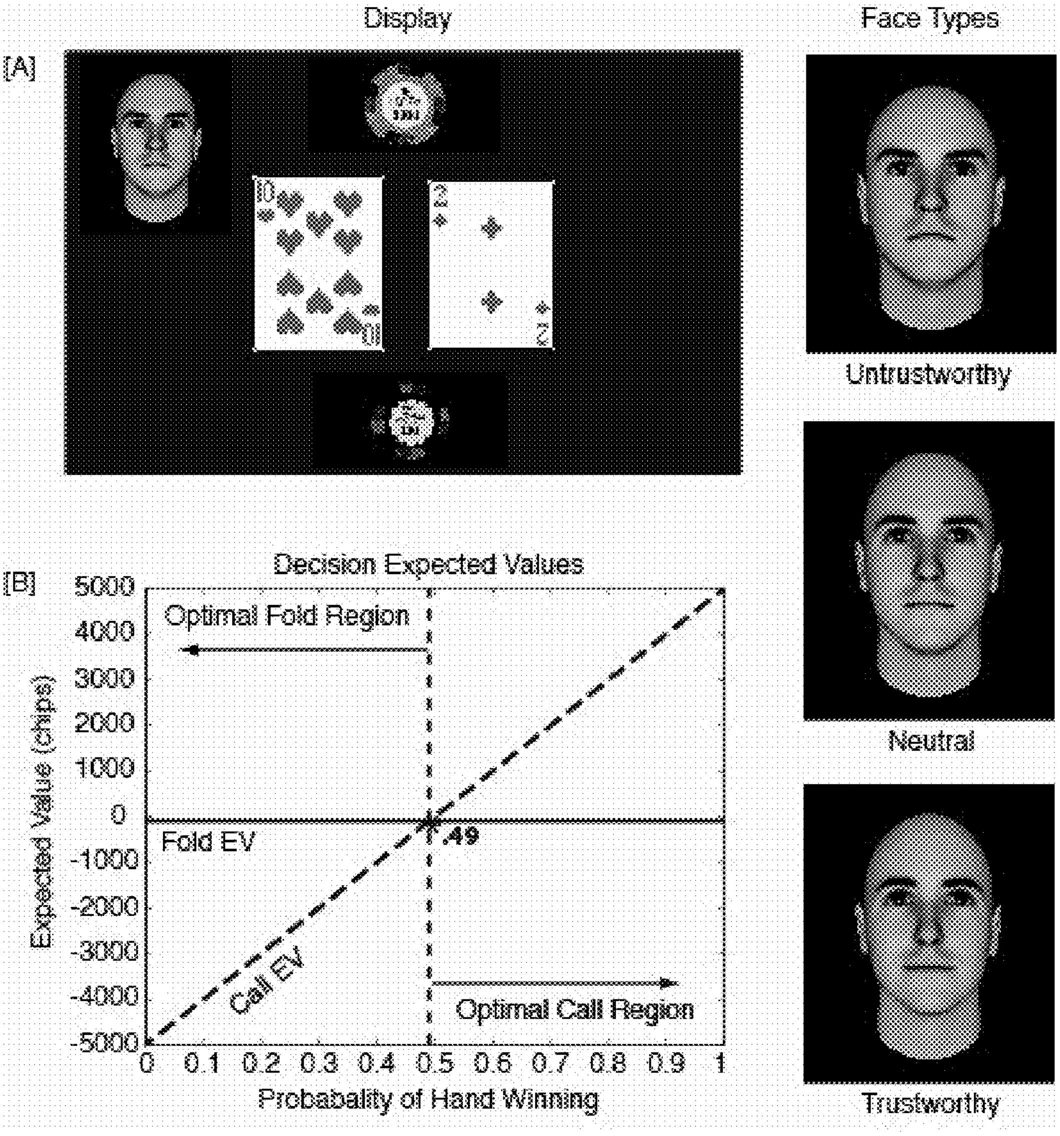
FIG. 7 illustrates one embodiment of observable communication signals provided in the poker experiment test of one embodiment of the disclosed methods.

FIG. 7 illustrates the display viewed by participants in this experiment, and expected values for each of the two possible decisions. [A] Participants played a simplified version of Texas Hold'em poker and were provided information about their starting hand and the opponent who was betting. Based on this information, they were required to make call/fold decisions. If participants choose to fold, they are guaranteed to lose their blind (−100 chips), whereas if they choose to call, they have a chance to either win or lose the bet amount (5000 chips) that is based on the probability of their hand winning against a random opponent. Opponent faces were obtained from an online database. The right column of the figure shows one face identity for three different trustworthiness values. [B] Graph shows how the expected value for each decision changes across starting hands. The 'optimal decision' would be the one that results in the greatest expected value. Therefore, participants should fold when the probability of their hand winning is below 0.49, and call if it is greater. See the Experimental Methods Section for additional details.

To investigate if people are inferring their opponent's style through face information, participants competed in a simplified poker game against opponents whose faces varied along an axis of trustworthiness: untrustworthy, neutral, and trustworthy. If people use information about an opponent's face, it predicts they should systematically adjust their wagering decisions, despite the fact that they receive no feedback about outcomes, and the value associated with the gambles is identical between conditions. Conversely, if people only use outcome-based information in competitive games, or use face information inconsistently, then there should be no reliable differences in wagering decisions between the groups.

As participants, 14 adults consented to participation in this study for monetary compensation. Participants were between 19 and 36 years of age, and all had normal or corrected-to-normal vision. In order to be eligible for this study, participants achieved a minimum score of 7/10 on a pre-experimental exam about the rules of Texas Hold'em poker, in addition to demonstrating no previous history of gambling addiction. The experimental protocol used in this study passed a Harvard University Human Subjects Review Committee.

Data from a pre-experimental inventory found that participants were novice poker players as 12 of the 14 in this study played less than 10 hours/year. Moreover, all participants in this study tended to play more 'live' games than online games. In fact, 12 of 14 participants played more than 90% of their games 'live', rather than online.

Participants saw a simple Texas Hold'em scenario that was developed using MATLAB's psychtoolbox, running on a Mac OSX system. The stimuli consisted of the participant's starting hand, the blind and bet amounts, in addition to the opponent's face (FIG. 7). Note that this set-up strips-away or controls for much of the information that is commonly used by poker players when making a decision, which is outside the focus of our experimental question (e.g., position in the sequence of betting, size of the chip stack, the number of active players in the pot, etc.).

The opponent's faces were derived from an online database that morphed neutral faces along an axis that optimally predicts people's subjective ratings of trustworthiness. More specifically, faces in the trustworthy condition are 3 standard deviations above the mean/neutral face along an axis of trustworthiness. Whereas, untrustworthy faces are 3 standard deviations below the mean/neutral face along this dimension.

The database provided 100 different 'identities'. Each of the faces was morphed to three trust levels, giving a neutral, trustworthy and untrustworthy exemplar for each face. Therefore, in this experiment, there were 300 total trials (100 identities×3 trust levels each), that were presented in a random order.

Two-card hand distributions were selected to be identical between levels of trustworthiness. In order to minimize the probability that participants would detect this manipulation, we used hand distributions that had identical value, but are different in their appearance (e.g., cards were changed in their absolute suit (i.e., hearts, diamonds, clubs, spades) without changing the fact that they were suited (e.g., heart, heart) or unsuited (e.g., heart, club). This precaution seemed to work as no participant reported noticing this manipulation.

Within each level of trustworthiness, we also selected hand distributions to have an equal number of optimal call (i.e., accepting a bet) and fold (not accepting a bet) decisions (50 call/50 fold). Optimal decisions are considered to be the decision that maximizes the expected value (i.e., the number of chips earned; See FIG. 2B). The expected value associated with folding is always negative 100 chips since it results in the guaranteed loss of the initial bet (or 'blind'), which is 100 chips, regardless of the starting hand. Conversely, when calling the opponent's bet (100 blind+4900 call amount=5000 chips), the expected value is based on the probability of the hand winning. Since opponents in this experiment are random, the probability of the hand winning was determined by simulating the player's starting hand against every possible random opponent's hand and community card combination. Therefore, optimal call decisions are those that the expected value for calling exceeds negative 100 chips (i.e., the expected value for folding). Against a random opponent, FIG.

7 [B] shows that optimal play would require people to call with hand winning probabilities that exceed 0.49, and fold otherwise. The bet size of 5000 chips was an attempt to maximize the number of possible hands in each of the optimal decision regions.

After participants passed the Texas Hold'em exam and signed the consent form, they were provided task with instructions. The instructions explained that they would be participating in a simplified version of Texas Hold'em poker. Unlike 'real' poker, they would always be in the big blind (i.e., they were required by the rules to make an initial bet of 100 chips) facing only one opponent who always bets 5000 chips.

Moreover, they would only be allowed two possible decisions: call or fold. Therefore, unlike 'real' poker, they would not be able to 'bluff' their opponent out-of the pot or 'out-play' their opponent since no extra cards are dealt. Participants were instructed that the only information they available have to make their betting decisions is their starting hand and the opponent who is betting. It was explained that similar to 'real' poker, different opponents may have different 'styles' of play. We did not mention anything about the opponent's face or the trustworthiness of the opponent. They were only told that if they choose to call, the probability of their hand winning is going to be based on their starting hand and their opponent's style. Of course, unknown to them, the opponents were always betting randomly in this study.

Unlike 'real' poker, no feedback about outcomes was provided after each trail and no 'community cards' were dealt. Rather, the hand was simulated and the outcome was recorded to use for consideration in their bonus pay. Participants received bonus pay that is based on the outcome of one randomly selected trial from the 300 possible hands. If participants chose to call the randomly selected trial, and the outcome was a win, they would earn a total of $15 ($5 participation+$5 gambling allowance+$5 bonus). Whereas, if participants decided to call and the outcome is a loss, then they would only earn $5 ($5 participation+$5 gambling allowance−$5 bonus). Finally, if participants chose to fold the randomly selected hand, they would earn $10 ($5 participation+$5 gambling allowance+$0 bonus:−$0.10 rounded to nearest dollar amount). Therefore, participants were motivated to make optimal decisions, as that would maximize their chance of winning bonus money. After completing the 300 trials, participants were paid and debriefed.

Figure 8A:
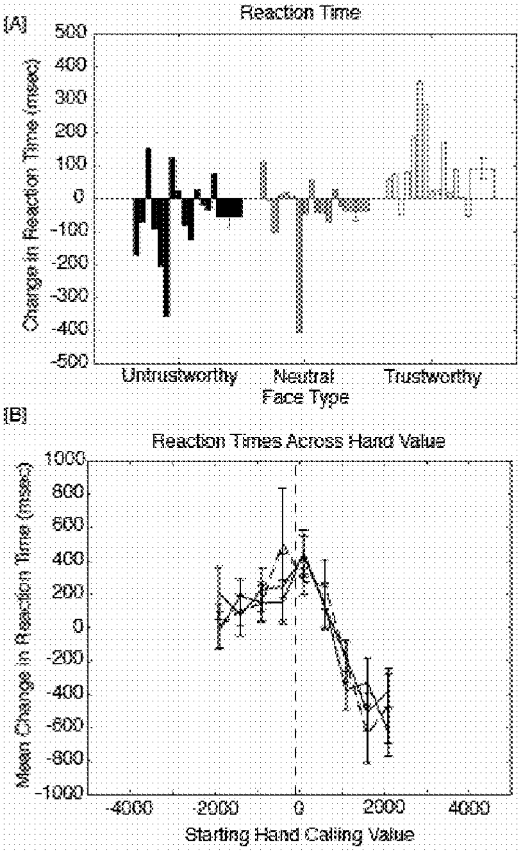
FIGS. 8A-8C illustrates quantitative measures from several subjects who participated in the described poker experiment test.

FIG. 8A shows average changes in reaction time across face conditions ([A]) and hand value ([B]). Reaction time is defined to be the interval between display onset and the time of decision. Change in reaction time is computed for each participant by calculating the mean reaction time in each face condition and subtracting-off the overall mean reaction time, across conditions. These means are then averaged across participants, to produce the graph in FIG. 8A. This procedure simply adjusts for the differences in baseline reaction time across different participants (i.e., transform to zero mean) and allows us to assess the impact of face-type on changes in reaction time, independent of differences in absolute levels of reaction time. A similar procedure of normalizing behavioral data within a subject, to permit comparison across the trust levels and hand qualities, was followed whenever 'changes' in a dependent measure are discussed.

FIG. 8A demonstrates changes in reaction times. For Panel A, the first 14 bars reflect individual participant data while the last bar represents the average for each condition (Error bars represent ±SEM). [A] Change in reaction time across face conditions. Participants took significantly longer to make a decision against a trustworthy opponent (White) than untrustworthy (Black) and Neutral (Gray) opponents. [B] Mean change in reaction time across starting hand value. People took significantly longer (collapsing across trustworthiness conditions) to make decisions for hands in the optimal fold region (left of black dashed line) than hands in the optimal call region (right of dashed line). Moreover, differences between trustworthiness groups were most pronounced around the decision boundary.

FIG. 8A shows that participants took longer to react to trustworthy opponents (White; Mean=38.08 msec, SE=23.94 msec) than to neutral opponents (Gray; Mean=−35.76 msec, SE=25.24 msec) and untrustworthy opponents (Black; Mean=−48.48 msec, SE=24.74 msec). A Friedman's test found a significant main effect of trustworthiness on reaction time, $\chi2(2)=7.00$, $p=0.03$. Note that Friedman's test is used throughout this paper due to violations of the normality assumption in our data that is required by repeated measures ANOVA. A Wilcoxon signed-rank test was used as a post-hoc test and demonstrated that the reaction times against a trustworthy opponent are significantly more than untrustworthy ($p=0.03$) and neutral ($p=0.03$) opponents. No other pairwise differences were found.

FIG. 8A demonstrates changes in reaction time against starting hand value. It is clear that reaction times across hand value are relatively consistent across face-types. However, any differences in reaction time across levels of trustworthiness tend to occur near the optimal decision boundary (Black dashed line). Moreover, it is evident that people are taking longer (collapsing across trustworthiness levels) on average to react to hands in the optimal fold region (4 lowest bins; Mean=+167.47 msec, SE=44.90) than to hands in the optimal call region (5 highest bins; Mean=−133.97 msec, SE=42.33). A Wilcoxon signed-rank test proved this difference to be significant ($p<0.01$).

Figure 8B:
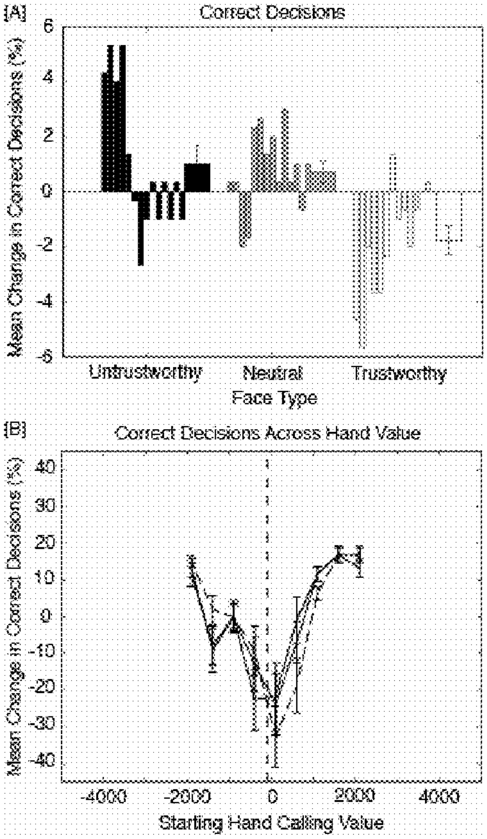

FIG. 8B displays mean change in percent correct decisions across levels of trustworthiness ([A]) and hand value ([B]). A correct decision was defined to be the decision that results in the greatest expected value (FIG. 4B). FIG. 3A shows that participants made significantly more mistakes against trustworthy opponents (White; Mean=−1.76%, SE=0.55%) than neutral (Gray; Mean=0.74%, SE=0.40%) and untrustworthy opponents (Black; Mean=1.02%, SE=0.70%). A Friedman's test found a significant main effect of trustworthiness on correct decisions, $\chi2(2)=8.32$, $p=0.02$. Wilcoxon signed-rank test was used as a post-hoc test demonstrated that participants made significantly more mistakes against trustworthy opponents than neutral ($p<0.01$) and untrustworthy ($p=0.04$) opponents. No other pairwise differences were observed.

FIG. 8B shows changes in correct decisions. For Panel A, the first 14 bars reflect individual participant data while the last bar represents the average for each condition (Error bars represent ±SEM). [A] Change in correct decisions across face types. Participants made significantly more mistakes against trustworthy opponents (White) than neutral (Gray) and untrustworthy (Black) opponents. [B] Mean change in correct decisions across starting-hand value. People did significantly worse (collapsing across trustworthiness conditions) for hands near the optimal decision boundary. Differences between groups were also more pronounced for these mid-value hands.

FIG. 8B depicts changes in correct decisions across hand value. The effects of face-type on correct decisions seem to be the most pronounced near the optimal decision boundary. Moreover, people tended make the most mistakes (collapsing across trustworthiness levels) for medium-valued hands (middle 3 bins; Mean=−16.71%, SE=2.59%) over low-value (lowest 3 bins; Mean=2.66%, SE=1.47%) and high-valued (highest 3 bins; Mean=14.05%, SE=0.75%) hands. A Friedman's test found a significant main effect of hand value on correct decisions, $\chi2(2)=91.07$, $p<01$, and a Wilcoxon signed-rank test showed that all of the pairwise differences were significant ($p<0.01$).

Figure 8C:
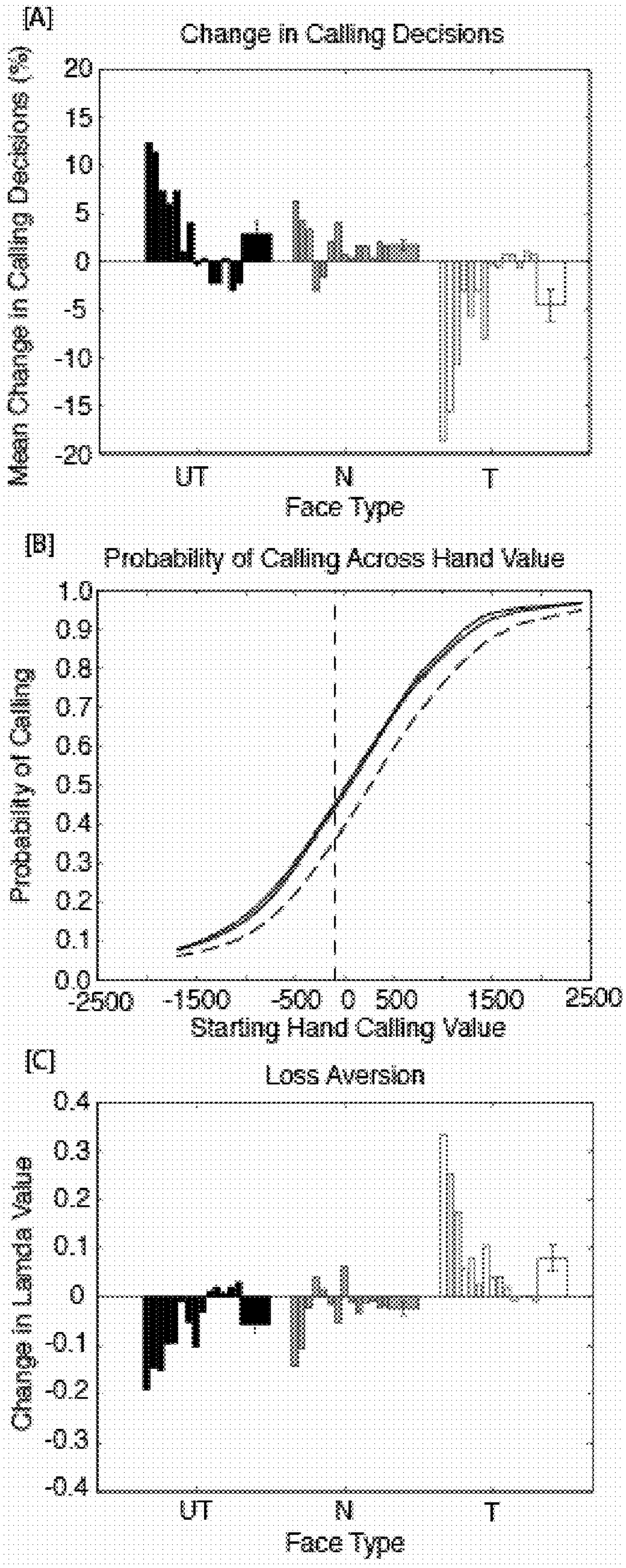

FIG. 8C shows mean changes in percent calling behavior ([A,B]) and differences in loss aversion parameters ([C]) across trustworthiness levels. Please note that, in poker, accepting an opponent's bet is termed calling, while not accepting their bet is termed folding. FIG. 5A demonstrates that people call less against trustworthy opponents (White; Mean=−4.52%, SE=1.72%) than against neutral (Gray; Mean=1.69%, SE=0.64%) and untrustworthy opponents (Black; Mean=2.83%, SE=1.40%). A Friedman's test found a significant main effect of trustworthiness on calling behavior, $\chi2(2)=10.51$, $p=0.01$. A Wilcoxon signed-rank test demonstrated that participants folded significantly more against trustworthy opponents than neutral ($p<0.01$) opponents, but not untrustworthy ($p=0.06$) opponents, although a trend was observed. No other pairwise differences were found.

In Panel A of FIG. 8B, the first 14 bars reflect individual participant data, while the last bar represents the average for each condition (Error bars represent ±SEM). [A] Change in calling decisions across face types. Participants called significantly less against trustworthy opponents (White) than neutral (Gray) opponents. [B] The observed changes in calling resulted from a shift in the average calling function for trustworthy faces. This suggests that participants needed a starting hand with greater expected value in order to call at similar rates against a trustworthy opponent. [C] Change in lambda values for the utility fits across face conditions. The results show that lambda values are significantly greater against trustworthy opponents than against neutral or untrustworthy opponents. Moreover, subjects are gain-loss neutral, unless they are playing a trustworthy opponent, when they show significant loss aversion.

In order to directly investigate how opponent information is impacting wagering decisions, a softmax expected utility model (See Supplementary Material) was used that separates the influence of three different choice parameters: a loss aversion parameter (lambda), a risk aversion parameter (rho), and a sensitivity parameter (gamma). These parameters have been shown to partially explain risky choices with numerical outcomes in many experimental studies, and in some field studies (Sokol-Hessner, et al., 2008). They were fit to each subject's data and averaged across subjects to explore the impact of opponent information on components of risk and loss preference revealed by wagering.

FIG. 8C shows the average probability of calling across the three different opponent conditions. The curves show that participants required a higher-value hand to call (at similar levels) against a trustworthy opponent (Dashed Curve) than a neutral (Solid 1 Curve) or untrustworthy (Solid 2 Curve) opponent. For example, at a 50% calling rate, it requires a hand with an expected value of 0 chips against a neutral and untrustworthy opponent, and a hand with an expected value of positive 300 chips against a trustworthy opponent.

The loss aversion parameter discussed above provides a way to directly quantify this 'shift' in calling decisions. FIG. 8C depicts the average lambda values across levels of trustworthiness. It was found that participants showed greater loss aversion against trustworthy opponents (White; Mean=0.08, SE=0.03) than against neutral (Gray; Mean=−0.02, SE=0.01) and untrustworthy opponents (Black; Mean=−0.05, SE=0.02). A Friedman's test found a significant main effect of trustworthiness on lambda values, $\chi2(2)=9.00$, $p=0.01$. A Wilcoxon signed-ranks test demonstrated that people showed significantly more loss aversion against trustworthy opponents than neutral ($p=0.01$) and untrustworthy ($p=0.02$) opponents. Moreover, If people are weighting gains greater than losses (gain seeking) lambda values should be significantly less than one, whereas if people weight gains and losses equally, the lambda value should be statistically equal to one (gain-loss neutral). However, if people are trying to avoid losses, the lambda value should be significantly above one (loss aversion). Lambda values were significantly above 1 (gain-loss neutral point) against trustworthy opponents (Mean=1.14, SE=0.06, p=0.04), but not against neutral (Mean=1.04, SE=0.06, p=0.55) or untrustworthy opponents (Mean=1.00, SE=0.06, p=0.96). This suggests that people show significant loss aversion when playing trustworthy opponents, but not against neutral or untrustworthy opponents. If the loss aversion for each subject is corrected, differences in mistakes between conditions disappears. No significant differences were found across trustworthiness conditions for risk aversion (rho), $\chi2(2)=3.57$, $p=0.17$, or sensitivity (gamma), $\chi2(2)=3.00$, $p=0.22$.

From these results, it is clear that people are using face information to modify their wagering decisions in a competitive task. These results can be easily framed within a Bayesian interpretation and are related to ideas in Bayesian explaining away. Since an opponent's 'style' is a hidden state, participants must estimate it through observable variables. For example, a Bayesian estimator could assume that an opponent is random (i.e., they bet uniformly across hand value) until information to the contrary is acquired. In our experiment, the only information participants have available about their opponent's style is the trustworthiness expressed by their face. If people are using beliefs that trustworthy opponents tend to bet with high-value hands, then they should adjust their decision criterion by making it more stringent than against a random opponent. Indeed, participants' observed changes in betting behavior (FIG. 8C) are in agreement with this interpretation.

However, unknown to participants, their increased loss aversion (FIG. 8C [B] and [C]) actually leads to more mistakes (FIG. 8B), since opponents in our experiment bet randomly. If feedback about outcomes or information about an opponent's hand (e.g., during a showdown) were available, a Bayesian estimator would use this information to update its beliefs about the opponent, forming a posterior estimate to use for the next hand. This predicts that face information should carry greater weight for betting behavior when there is little or no additional data about an opponent available (e.g., our experiment) or with extremely noisy opponent data (e.g., novice who doesn't know how to interpret this information). It is also worth noting that even though the relative increase in errors (−3%) against trustworthy opponents seems small (FIG. 8B), the average return on investment for the most elite online poker players is only 6.8%. Therefore, an increase in mistakes of this magnitude could lead to significant decreases in a player's earnings over time.

Although the faces used in this experiment are thought to optimally predict subjective ratings of trustworthiness, it is also known that impressions of trust are deeply related to other attributes, such as perceived happiness, dominance, competence, etc. To investigate the possible role of these attributes, we conducted an independent rating task using a different group of subjects and correlated these results with the wagering behavior observed in this study. The results demonstrate that the impressions of trustworthiness also influence impressions of many other attributes that correlate with wagering decisions. Therefore, a more general conclusion is that common avoidance cues (dominant, angry, masculine) lead to more aggressive wagering decisions (i.e., increased calling), whereas approach cues (happy, friendly, trustworthy, attractive) tend to lead to conservative wagering decisions (i.e., increased folding). Although this seems contrary to evolutionary predictions, it is rational within the context of poker since approach cues may suggest the opponent has a good hand and/or is less likely to bluff. This interpretation is supported by the fact that subjects were more likely to call against opponents who were perceived to frequently bluff, and these opponents have similar subjective impression rating trends as those who are high on avoidance dimensions.

The increased influence of trustworthiness on reaction time (FIG. 8A) and correct decisions (FIG. 8B) around the optimal decision boundary suggests that people are using face information most for medium-value hands. This could be explained by optimal data fusion, which states that the more uncertainty people have about the value of their hand, the more they should weigh face information when making a betting decision. Since participants in our experiment were novices (12 of 14 play less than 10 hours/year), they may have a more reliable estimate of high-value hands since those tend to be more salient/memorable (e.g., face cards, aces, pairs, etc.) than medium- and low-value hands. Indeed, participants in our study took significantly longer to react to hands in the optimal fold region (FIG. 8A), and also made significantly more mistakes for medium- and low-value hands (FIG. 8B), supporting this notion.

It is also interesting that all of the changes in wagering decisions were observed against trustworthy opponents, while untrustworthy opponents did not yield any significant results. This asymmetry is even more fascinating given that people's perception of trustworthiness is more sensitive to changes between untrustworthy and neutral faces, than between neutral and trustworthy faces. One possible explanation stems from the assumption that people use a random opponent decision criterion in this task, unless there is information that an opponent is betting with non-random hands. In this respect, neutral and untrustworthy faces are functionally the same: neutral faces do not provide information about an opponent's style, while untrustworthy faces may suggest that opponents are betting with poor hands. However, since participants are already assuming opponents bet randomly, they cannot decrease their criterion any further. In agreement with this proposal, FIG. 8C shows that the inflection point for the neutral (Solid 1) and untrustworthy (Solid 2) curves is very close to the optimal decision boundary for a random opponent. However, trustworthy faces may provide information that the opponent has a high-value hand, leading to the observed shift towards more conservative wagering behavior.

Although we have been interpreting the results with respect to normative decision theory, research has also demonstrated that impressions of trust can occur extremely rapidly, and that implicit information can also modify brain activity and behavior. In fact, research has also shown that loss aversion is tightly related to emotional arousal, suggesting the loss aversion observed against trustworthy opponents (FIG. 8C) could be an implicit reaction.

In conclusion, we have shown that rapid impressions of opponents modify wagering decisions in a zero-sum game with hidden (opponent) information. Interestingly, contrary to the popular belief that the optimal poker face is neutral in appearance, the face that invokes the most betting mistakes by our subjects is has attributes that are correlated with trustworthiness. This suggests that poker players who bluff frequently may actually benefit from appearing trustworthy, since the natural tendency seems to be inferring that a trustworthy-looking player bluffs less. More generally, these results are important for competitive situations in which opponents have little or no experience with one another, such as the early stages of a game, or in one-shot negotiation situations among strangers where 'first impressions' matter.

Although this invention has been described in the above forms with a certain degree of particularity, it is understood that the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention which is defined in the claims and their equivalents.

I claim:

1. A computer based method of measuring an entity reaction, said method comprising:

receiving a reaction of a second entity to a first and second communication signal;

the reaction representing an estimate of an attribute of a first entity given the first and second communication signal; and automatically determining an entity reaction measure from the reaction wherein the entity reaction measure is a probability of the reaction of the second entity to the first and second communication signal.

2. The method of claim 1 wherein the entity reaction measure comprises a probability curve automatically computed as a probability distribution for the reaction as a function of the communication signal.

3. The method of claim 1 wherein the first and second communications signals are each mapped to a first and second quantitative representation of the communication signals according to a translation protocol.

4. The method of claim 1 wherein the first and second communications signals are mapped to a first and second quantitative representation of the communication signals according to a translation protocol and the quantitative representation comprises a Gaussian distribution of the probability of the first and second communication signals given the attribute.

5. The method of claim 1 wherein the first and second communication signal is one of the group consisting of:

a visual signal;

a verbal signal; and a gesture signal.

6. The method of claim 1 wherein the step of automatically determining an entity reaction measure from the reaction comprises a processor executing a computer program product to automatically determine the entity reaction measure from the reaction.

7. The method of claim 1 wherein the entity reaction measure is a quantitative measure comprising a Gaussian distribution of the probability of the reaction of the first entity to the first and second communication signals.

8. The method of claim 7 wherein the quantitative measure reflects a bias of the entity.

9. The method of claim 1 further comprising determining an optimal reaction measure reflecting a probability of an optimal reaction of the first entity to the first and second communication signals.

10. The method of claim 9 wherein one of the first and second communication signals has a known relationship to the attribute and the optimal reaction measure is determined by a probability distribution for the known relationship to the attribute as a function of the communication signal.

11. The method of claim 9 further comprising comparing the optimal reaction measure to the entity reaction measure to create an entity calibration measure.

12. A computer based method of measuring an entity reaction, said method comprising:

receiving a reaction of a second entity to a first and second communication signal;

the first and second communication signals comprising computer generated communication signals;

the reaction representing an estimate of an attribute of a first entity given the first and second communication signal;

the first communication signal having a known relationship to the attribute and the second communication signal having an unknown relationship to the attribute;

determining an entity reaction measure from the reaction wherein the entity reaction measure is a probability of the reaction of the first entity given the first and second communication signals;

determining an optimal reaction measure wherein the optimal reaction measure comprises a probability of the reaction given the first communication signal; and determining an entity calibration measure from the entity reaction measure and the optimal reaction measure.

13. The method of claim 12 wherein the entity reaction measure and the optimal reaction measure are determined from a plurality of reactions to a plurality of first and second communication signals.

14. The method of claim 12 wherein the entity calibration measure is a bias of the first entity.

15. A computer based system for measuring an entity reaction, said system comprising:

a means for receiving a reaction of a second entity to a first and second communication signal;

the reaction representing an estimate of an attribute of the first entity given the first and second communication signal; and a means for automatically determining an entity reaction measure from the reaction wherein the entity reaction measure is a probability of the reaction of the second entity to the first and second communication signal.

16. The computer based system of claim 15 further comprising:

a means for translating the communication signal to a quantitative representation of the communications signal comprising a Gaussian distribution of the probability of the first and second communication signals given the attribute; and the means for automatically determining an entity reaction measure comprises a processor executing a computer program product capable of computing a probability distribution for the reaction as a function of the communication signal to determine the entity reaction measure.

* * * * *